United States Patent [19]

Nakamura

[11] Patent Number: 6,011,933

[45] Date of Patent: Jan. 4, 2000

[54] CAMERA WITH CARTRIDGE CHAMBER FORMED BY MAIN BODY AND REAR COVER

[75] Inventor: Yoshikazu Nakamura, Tokyo, Japan

[73] Assignee: Asahi Kogaku Kyogo Kabushiki Kaisha, Tokyo, Japan

[21] Appl. No.: 09/022,795

[22] Filed: Feb. 13, 1998

[30] Foreign Application Priority Data

Feb. 18, 1997 [JP] Japan ................................. 9-033990

[51] Int. Cl.$^7$ .................................................. G03B 17/02
[52] U.S. Cl. ............................................................. 396/538
[58] Field of Search ............................. 396/6, 535, 536, 396/538, 541

[56] References Cited

U.S. PATENT DOCUMENTS

D. 387,368  12/1997  Matsuda .
4,529,282   7/1985   Yamamoto .
5,146,255   9/1992   Nakai et al. ................................. 396/6
5,732,300   3/1998   Hosokawa .
5,737,659   4/1998   Stiehler et al. ...................... 396/538 X
5,867,739   2/1999   Lamphron ........................... 396/538 X Primary Examiner—Howard B. Blankenship
Attorney, Agent, or Firm—Greenblum & Bernstein, P.L.C.

[57] ABSTRACT

A body structure of a camera having a film cartridge chamber which as a whole is formed in the shape of a hollow cylinder and has an opening/closing lid at an axial end portion thereof. The hollow cylindrical film cartridge chamber is formed by a camera body and a rear cover which is formed separately from the camera body and is secured to a rear of the camera body. The outer appearance of the camera is formed by an outer surface of the rear cover. It is possible to make the camera further compact.

6 Claims, 8 Drawing Sheets

CAMERA WITH CARTRIDGE CHAMBER FORMED BY MAIN BODY AND REAR COVER

BACKGROUND OF THE INVENTION

The present invention relates to a body structure of a camera.

A film cartridge for an advanced photo system (APS) is provided at a film advancing and retreating port with a light shielding door which is normally closed. If the film cartridge is loaded in a film cartridge chamber of the camera, and an opening/closing lid is closed, the light shielding door is opened, and the film is fed out.

One of major differences between such an APS camera and a 135 mm-format camera is that the opening/closing lid is provided at one axial end of the generally cylindrical film cartridge chamber, and the film cartridge is inserted or removed in its axial direction.

SUMMARY OF THE INVENTION

An object of the present invention is to provide a novel body structure of a camera, to thereby make the camera further compact.

The present invention is characterized in that a hollow cylindrical film cartridge chamber is formed by a camera body and a rear cover which is formed separately from the camera body and is secured to a rear of the camera body, and that the outer appearance of the camera is formed by an outer surface of the rear cover. In other words, the inner surface of the rear cover directly forms a portion of the film cartridge chamber, and the film cartridge chamber which as a whole is formed in the shape of a hollow cylinder is not formed before the rear cover is secured to the camera body.

If parts of a driving mechanism for opening or closing the light shielding door of a film cartridge loaded in the film cartridge chamber in linking with the opening or closing operation of the opening/closing lid are supported by the rear cover, the space utilization efficiency improves further, and the assembly of the driving mechanism is also facilitated. The parts of the driving mechanism may include a driving lever pivotally secured to an inner surface of the rear cover and an operation lever pivotally secured to an outer surface thereof. Further, an ejector lever for urging the film cartridge inserted in the film cartridge chamber toward the opening/closing lid may be further supported by the inner surface of the rear cover, and a parent plate for covering the parts of the driving mechanism is preferably provided on the inner surface of the rear cover.

The present disclosure relates to the subject matter contained in Japanese patent application No. 9-33990 filed on Feb. 18, 1997 which is expressly incorporated herein by reference in its entirety.

DETAILED DESCRIPTION OF THE PREFERRED EMBODIMENT

Figure 9:
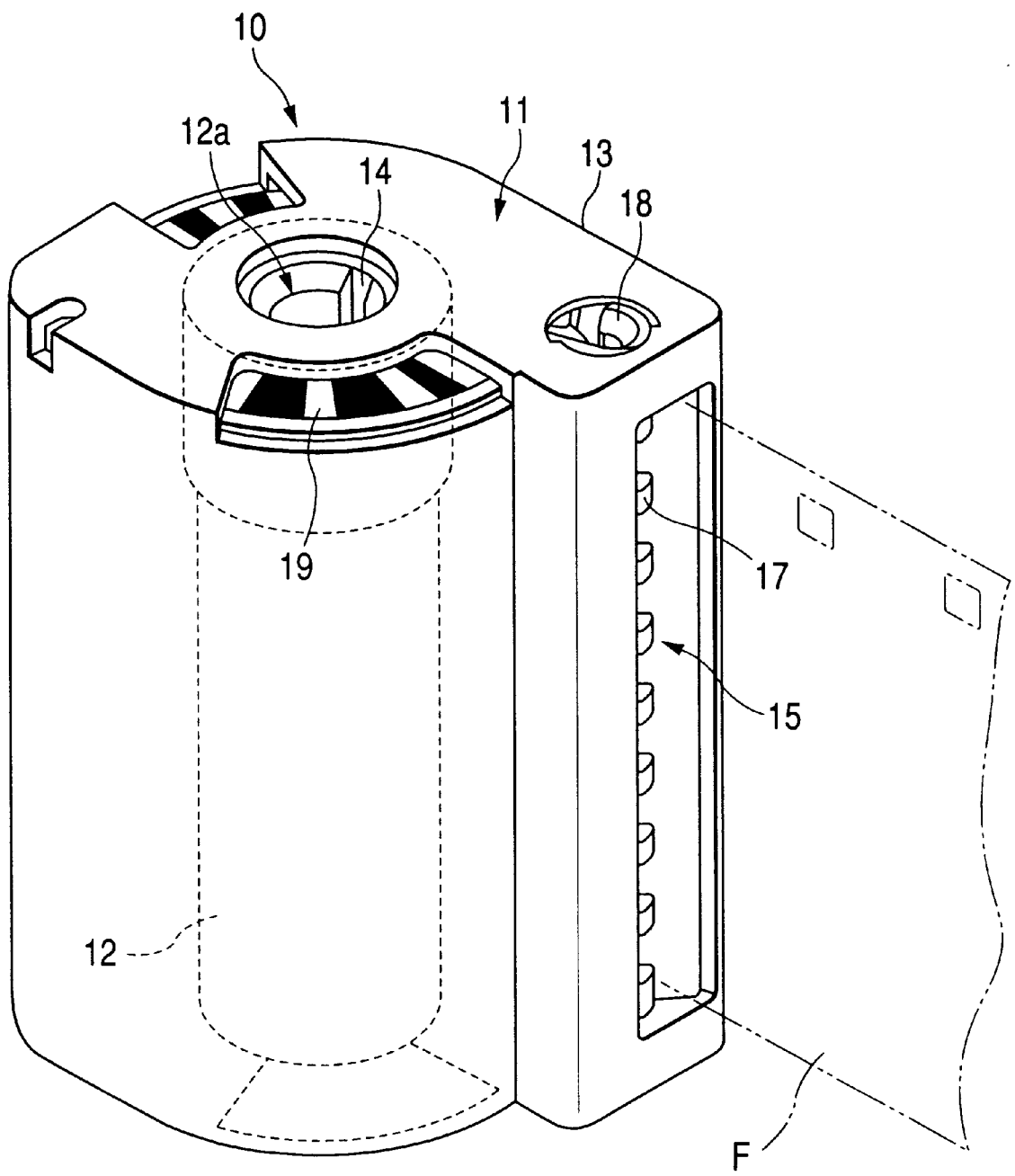
FIG. 9 is a perspective view illustrating the outer appearance of an APS film cartridge.

Referring now to FIG. 9, a description will be given of a film cartridge for APS.

In a film cartridge 10, a film F is wound around a cartridge spool 12 which is rotatably accommodated in a hollow cylindrical housing 11. The cartridge spool 12 has a substantially cylindrical spool-driving-shaft receptacle 12a at one end portion thereof, which defines a hole and faces one end surface of the housing 11. A key groove 14 is formed on an inner peripheral wall of the spool-driving-shaft receptacle 12a to axially extend from an open end face thereof. A film advancing/retreating port 15 is elongated in a longitudinal direction at one side surface of the housing 11, and a light shielding door 17 for opening and closing the film advancing/retreating port 15 is provided therein. The light shielding door 17 is normally closed to prevent the sensitization of the film F inside the housing 11. This light shielding door 17 is axially supported inside the housing 11 by means of a light-shielding-door actuating shaft 18 so as to be rotatable to open or close the film advancing/retreating port 15. Provided adjacent the one side surface of the housing 11 where the film advancing/retreating port 15 is formed, is a planar side surface 13 which linearly extend therefrom in the film traveling direction. Further, a portion of a data disk 19 is exposed at the one end surface of the housing 11. This data disk 19 is rotated along with the cartridge spool 12.

Figure 1:
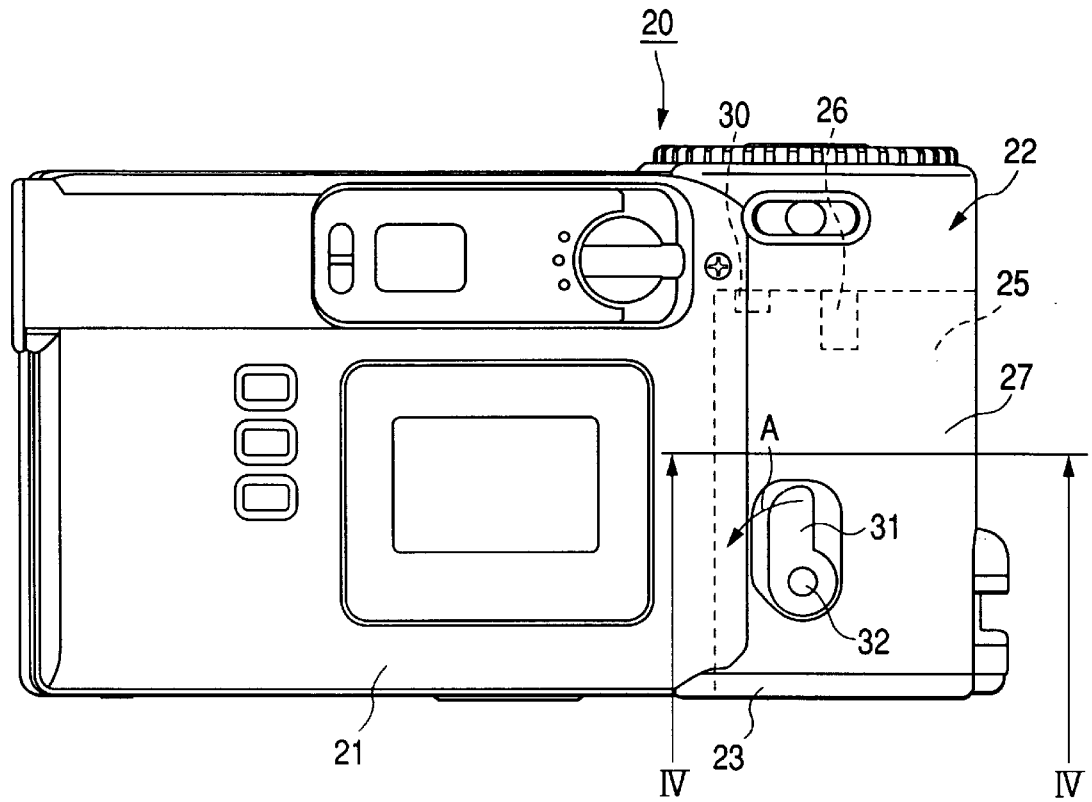
FIG. 1 is a rear view of the outer appearance of an APS camera having the body structure in accordance with the present invention.
Figure 2:
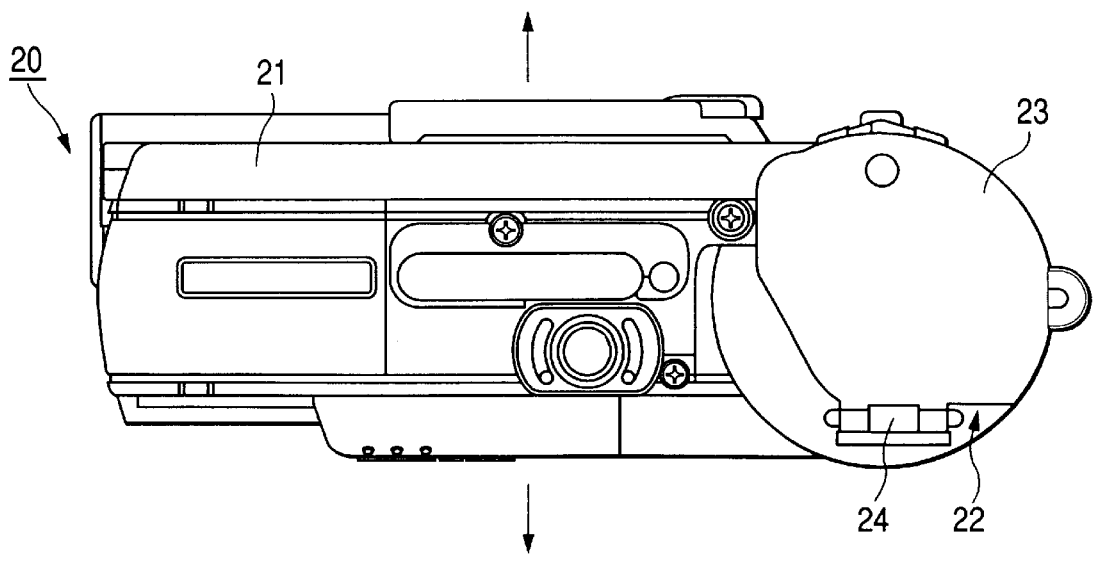
FIG. 2 is a bottom view of the outer appearance of the APS camera.
Figure 3:
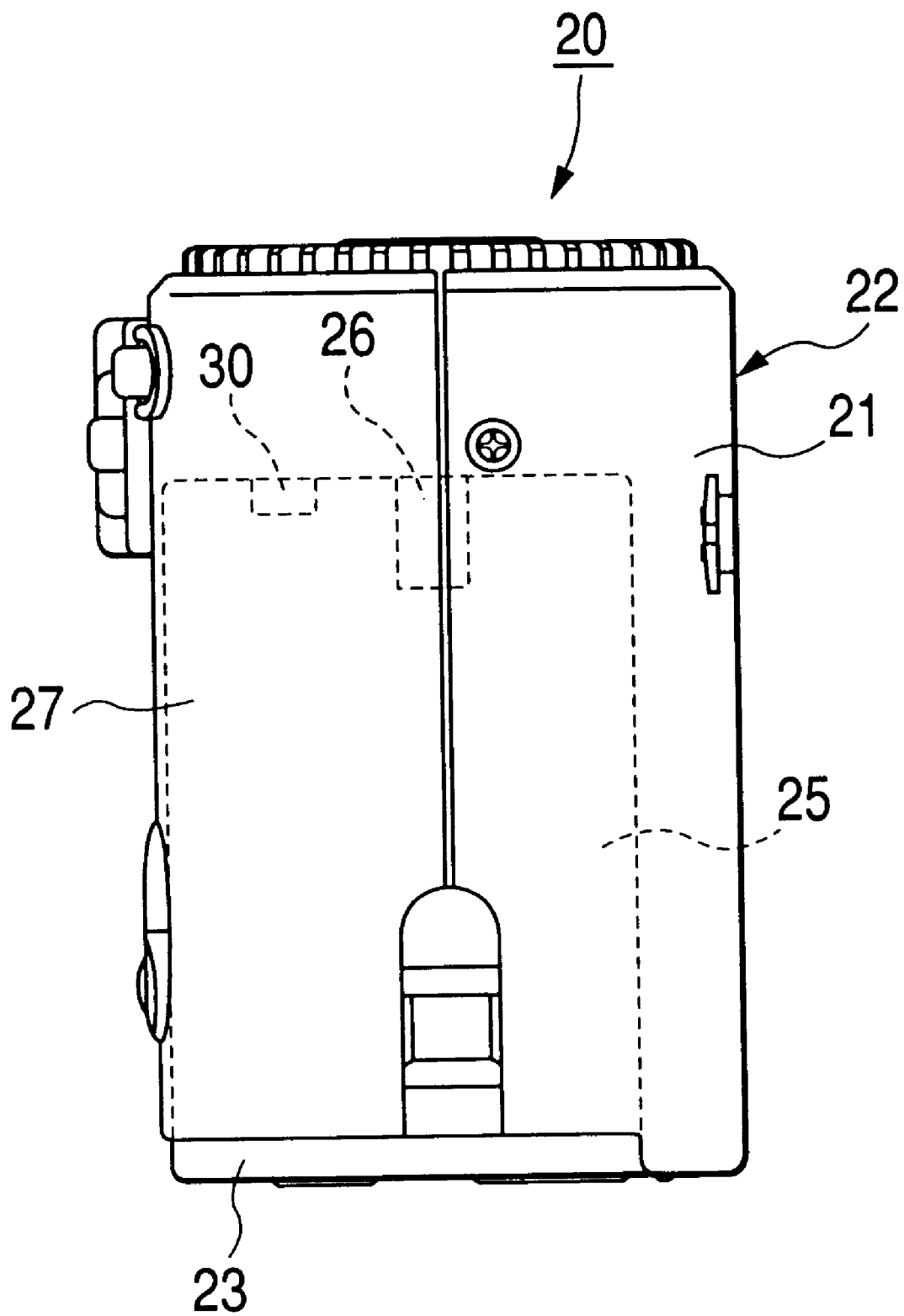
FIG. 3 is a side elevational view taken from a grip portion side of APS camera.

FIGS. 1 to 3 show an outer appearance of a camera 20 for use with the above-described film cartridge 10. This camera 20 has a grip portion 22 on the right-hand side of a camera body 21, which is formed into such a cylindrical shape as to be gripped by a photographer comfortably. The cylindrical grip portion 22 defines a film cartridge chamber 10, one end of which is opened whereas the other end of which is closed. An opening/closing lid 23 for opening or closing the opened end of the film cartridge chamber 10 is pivotably supported through a hinge portion 24 on a bottom-side end portion of the grip portion 22. Incidentally, the hinge portion 24 is embedded in the grip portion 22, and thus it does not project substantially from the bottom of the camera 20.

The substantially cylindrical film cartridge chamber 25 in the grip portion 22 is designed to accommodate the aforementioned film cartridge 10 therein. An axial end portion (a lower end portion) of the film cartridge chamber 25 is defined by the aforementioned opening/closing lid 23, and if the opening/closing lid 23 is opened, the film cartridge 10 can be loaded into the film cartridge chamber 25. On the other hand, a spool driving shaft 26 for engagement with the aforementioned spool-driving-shaft receiving receptacle 12a projects from the other axial end portion (an upper end portion) of the film cartridge chamber 25. This spool driving shaft 26 has a radially projecting portion which fits in the key groove 14, and is rotated forwardly or reversely by an unillustrated film feeding motor, so as to drive the cartridge spool 12 in the film feeding direction or in the film rewinding direction. Apart from the spool driving shaft 26, an engaging shaft 30 of a door driver 55 projects from the upper end portion of the film cartridge chamber 25. The engaging shaft 30 is a shaft member which has a shape capable of engaging the light-shielding-door actuating shaft 18 of the film cartridge 10, and has a radially projecting portion for preventing the relative rotation at the time of engagement. Incidentally, a description of the door driver 55 will be given later.

Figure 4:
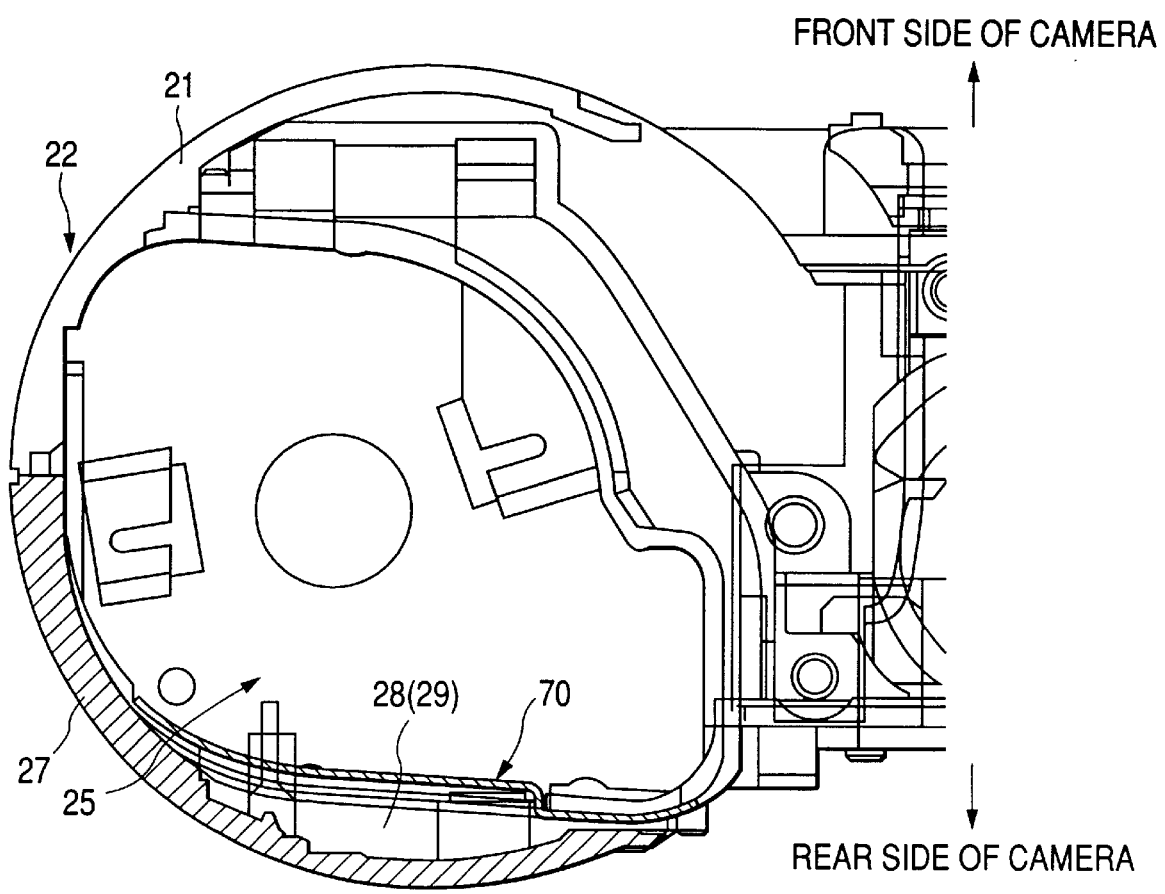
FIG. 4 is a horizontal cross-sectional view, taken along line IV—IV of FIG. 1, of the grip portion having a film cartridge chamber.

FIG. 4 shows a horizontal cross section of the film cartridge chamber 25 and its vicinities, as viewed from the bottom side of the camera. The front portion side of the grip portion 22 is formed by the camera body 21, while the rear portion side thereof is formed by a rear outer appearance cover 27 which is a separate member from the camera body 21. Thus, the grip portion 22 has a substantially circular cross section. The rear outer appearance cover 27 (the member shown by hatching in the drawing) is a curved plate-shaped member having as its outer shape a cylindrical surface whose center is coincident with the axis of the grip portion 22. The rear outer appearance cover 27 is fixed to the rear of the camera body 21 after being molded separately from the camera body 21.

As described before, the film cartridge chamber 25 is provided in the grip portion 22, but the front portion side of the film cartridge chamber 25 is formed as a portion of the inner wall of the camera body 21. Meanwhile, the rear portion side of the film cartridge chamber 25 is formed by the inner peripheral surface of the rear outer appearance cover 27. The outer peripheral surface of this rear outer appearance cover 27 constitutes the outer appearance of the camera 20 concurrently. That is, the inner surface of the rear outer appearance cover 27 which is an outer appearance member of the camera directly forms a portion of the film cartridge chamber 25, the film cartridge chamber 25 is not completed by the camera body 21 alone, and the film cartridge chamber 25 is formed only when the rear outer appearance cover 27 is attached. A major characteristic of the present invention lies herein. In the present invention, since the rear outer appearance cover 27 itself forms a portion of the film cartridge chamber 25, an additional rear outer appearance cover or an additional member for defining the film cartridge chamber can be dispensed with, thereby making it possible to improve the space utilization efficiency and make the camera compact in size.

The film cartridge chamber 25 requires a lock mechanism for locking the opening/closing lid 23 to inhibit the opening operation when the opening/closing lid 23 is closed. In addition, the film cartridge 10 is provided with the light shielding door 17 as shown in FIG. 9, so that a light-shielding-door opening/closing mechanism is required which opens or closes the light shielding door 17 in linking with the locking operation of the opening/closing lid 23 when the film cartridge 10 is loaded in the film cartridge chamber 25. In the camera 20 in accordance with this embodiment, a lock mechanism 28 and a light-shielding-door opening/closing mechanism 29 are partially built on the rear outer appearance cover 27. A detailed description thereof will be given herein under.

An operation lever 31, which is rotatable about a shaft 32, is pivotally held on the outer surface side of the rear outer appearance cover 27 (FIG. 1). The shaft 32 is passed through to the inner surface side of the rear outer appearance cover 27, and a driving plate 33 (FIG. 5) which is axially supported by the shaft 32 is rotated in association with the rotating operation of the operating lever 31. An engaging projection 34, which projects in parallel with the axial direction of the shaft 32, is formed integrally with the driving plate 33, and this engaging projection 34 is rotatively urged by an extension spring 35 toward a rotated position which is the position shown in FIG. 5. The driving plate 33 cannot be rotated counterclockwise in the drawing from that urged position, but can be rotated clockwise against the extension spring 35. Accordingly, the operation lever 31, which is formed integrally with the driving plate 33, can be rotated only the direction of arrow A in FIG. 1, and is returned to the rotated position in FIG. 1 by the extension spring 35 if the operation is canceled. This extension spring 35 may be a torsion spring whose opposite ends are connected to the driving plate 33 and the rear outer appearance cover 27, respectively.

A large driving lever 36 extending in the vertical direction of the came r a is pivotally held on the inner surface of the rear outer appearance cover 27 by means of a rotating shaft 37. The driving lever 36 is resiliently held in the rotated position, shown by the solid lines in FIG. 5, by means of a torsion spring 38 provided on the inner surface of the rear outer appearance cover 27. When the driving lever 36 is at this resiliently held position, the engaging projection 34 of the aforementioned driving plate 33 engages a rotatively operating portion 39. Since the acting position of the torsion spring 38 and the rotatively operating portion 39 are at mutually opposite positions with the rotating shaft 37 placed therebetween, when a force for pressing the rotatively operating portion 39 clockwise in FIG. 5 has acted, the driving lever 36 is rotated clockwise against the torsion spring 38. A driving-lever retaining spring 40 is secured in the vicinity of the rotatively operating portion 39 of the driving lever 36. This driving-lever retaining spring 40 has a bent arm portion 41 at its end portion, and an engaging projection 42, which is engaged with or disengaged from this bent arm portion 41, is projectingly provided on the rear outer appearance cover 27. When the driving lever 36 is at the aforementioned resiliently held position, the bent arm portion 41 abuts against an inclined surface 42a of the retaining projection 42, and permits the clockwise rotation of the driving lever 36. If the driving lever 36 is rotated to some extent from the resiliently held position, the bent arm portion 41 engages an upright wall 42b of the retaining projection 42, thereby restricting the return of the driving lever 36 to the resiliently held position (the state shown by the broken lines in FIG. 5).

A lower end of the driving lever 36 is formed as a lock leg 43 which is bent toward the retaining projection 42. Meanwhile, a lock leg 44 on the opening/closing lid side, which forms a symmetrical shape with the lock leg 43, is projectingly provided on the opening/closing lid 23. The opening/closing lid 23 is opened or closed with the hinge portion 24 (FIG. 2) on the front side of the camera as its axis, so that the amount of movement of that portion of the opening/closing lid 23 which contacts the rear outer appearance cover 27 on the rear side of the camera becomes maximum during opening or closing. The lock leg 44 is provided on the inner side of the portion which contacts the rear outer appearance cover 27, and is situated between the aforementioned engaging projection 42 and the lock leg 43 when the opening/closing lid 23 is closed. For this reason, if the opening/closing lid 23 is closed in the state in which the bent arm portion 41 of the driving-lever engaging spring 40 is engaged with the upright wall 42b of the engaging projection 42 and the rotation of the driving lever 36 is thereby restricted, the lock leg 44 pushes the bent arm portion 41 upward, thereby canceling the engagement between the bent arm portion 41 and the upright wall 42b. Then, the driving lever 36 is returned to the resiliently held position by the force of the torsion spring 38, and the lock leg 43 and the lock leg 44, which form a pair, engage each other. As a result, the opening/closing lid 23 is set in a locked state in which the opening/closing lid 23 cannot be opened. Namely, the resiliently held position of the driving lever 36 shown by the solid lines in FIG. 5 can be called a locked position. Further, in the retained position of the driving lever 36 shown by the broken lines in FIG. 5, the lock leg 43 and the lock leg 44 do not engage each other, and the opening/closing lid 23 is openable, so that this position can be called an unlocked position. The opening/closing lid 23 causes the driving lever 36 to return to the locked position by using the moving force in its closing operation.

Meanwhile, a fork-shaped driving leg 45 is formed at an upper end of the driving lever 36. This driving leg 45 is connected to the light-shielding-door opening/closing mechanism 29. The light-shielding-door opening/closing mechanism 29 opens or closes the light shielding door 17 by rotating the light-shielding-door actuating shaft 18 of the film cartridge 10 by making use of the moving force of the driving lever 36 between the locked position and the unlocked position, and its essential portions are provided on an upper portion of the film cartridge chamber 25. Hereafter, a description will be given of its structure with reference to FIGS. 6 to 8 which show top views of the camera.

A partition plate 50 is provided in the grip portion 22. This partition plate 50 is formed as a part of the camera body 21, and its lower surface forms an upper end surface of the film cartridge chamber 25. A rotating shaft 51, which extends substantially in parallel with the axial direction of the film cartridge chamber 25, is formed on an upper surface of the partition plate 50. A relay gear 52 is axially supported by this rotating shaft 51. The relay gear 52 has a rotatively operating arm portion 53 which projects radially and is placed between the legs of the fork-shaped driving leg 45. When the driving lever 36 moves between the locked position and the unlocked position, the rotatively operating arm portion 53 is pushed by the driving leg 45, allowing the relay gear 52 to rotate in the forward or reverse direction. Specifically, when the driving lever 36 is rotated from the unlocked position to the locked position, the relay gear 52 is rotated counter-clockwise in FIG. 6, while when the driving lever 36 is rotated from the locked position to the unlocked position, the relay gear 52 is rotated clockwise.

Figure 6:
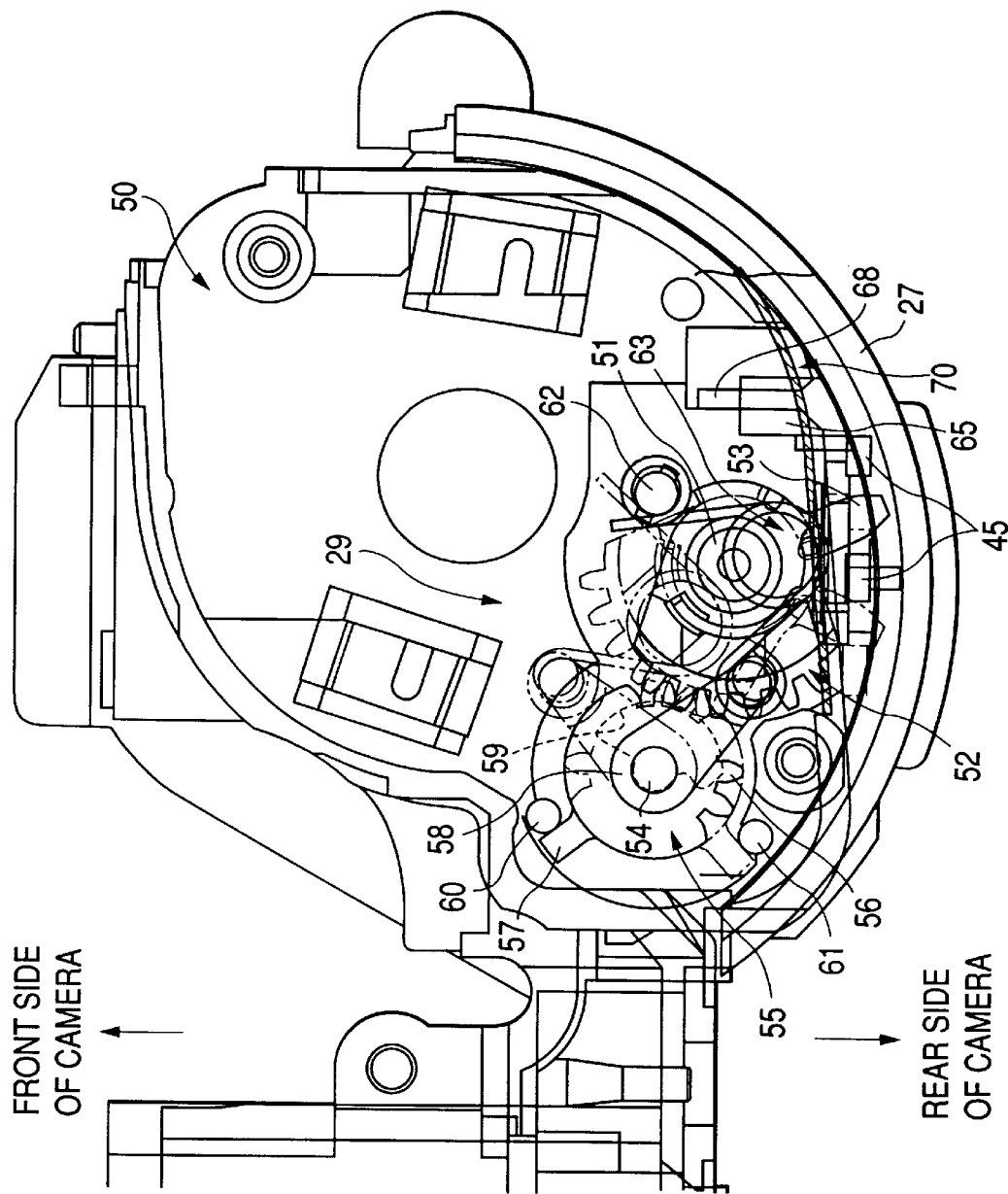
FIG. 6 is a plan view, taken from an upper surface side of the camera, of parts of a light-shielding-door opening/closing mechanism.
Figure 7:
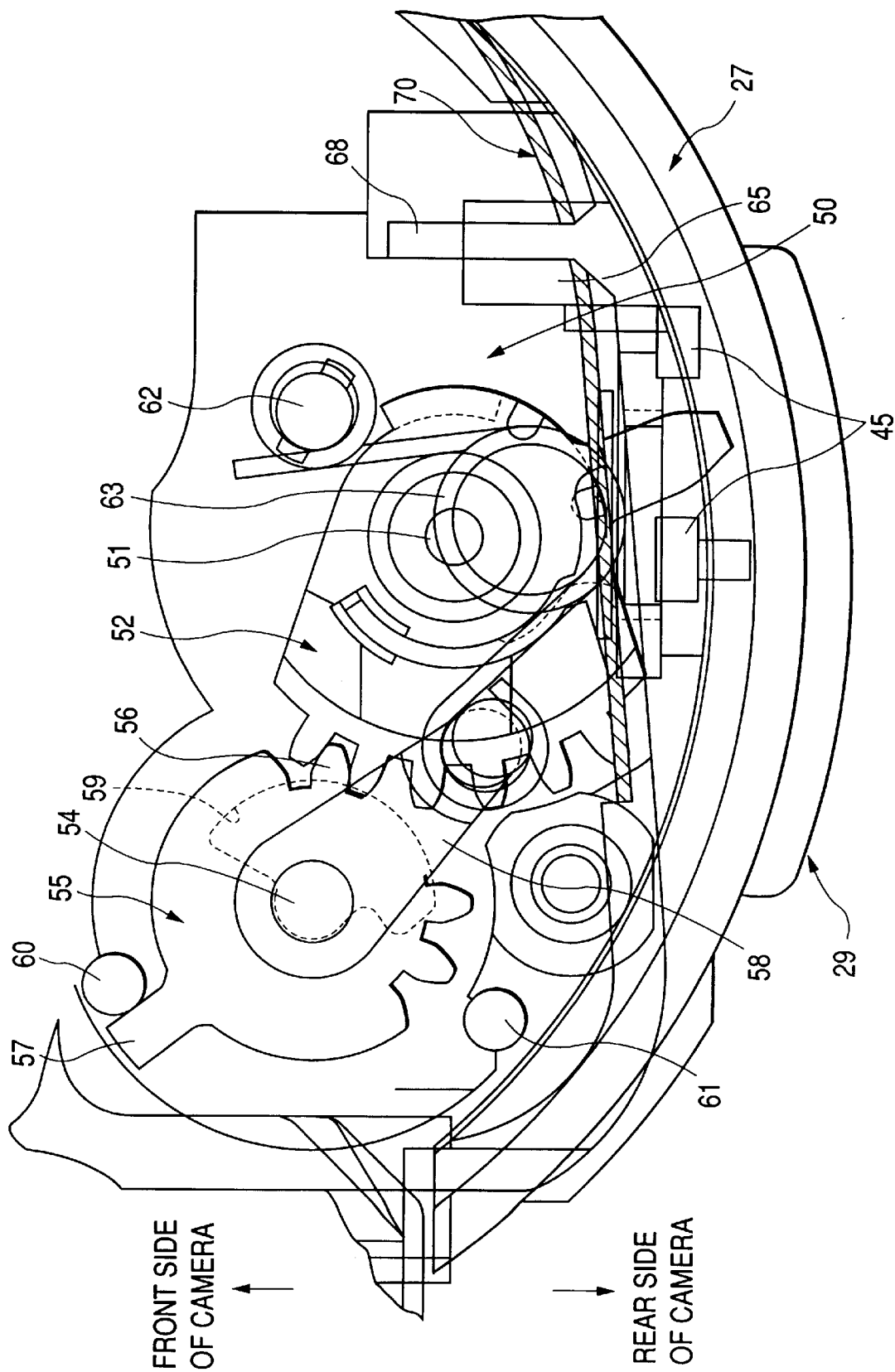
FIG. 7 is an enlarged plan view of essential portions of the light-shielding-door opening/closing mechanism, shown in FIG. 6, with an opening/closing lid in a locked state.
Figure 8:
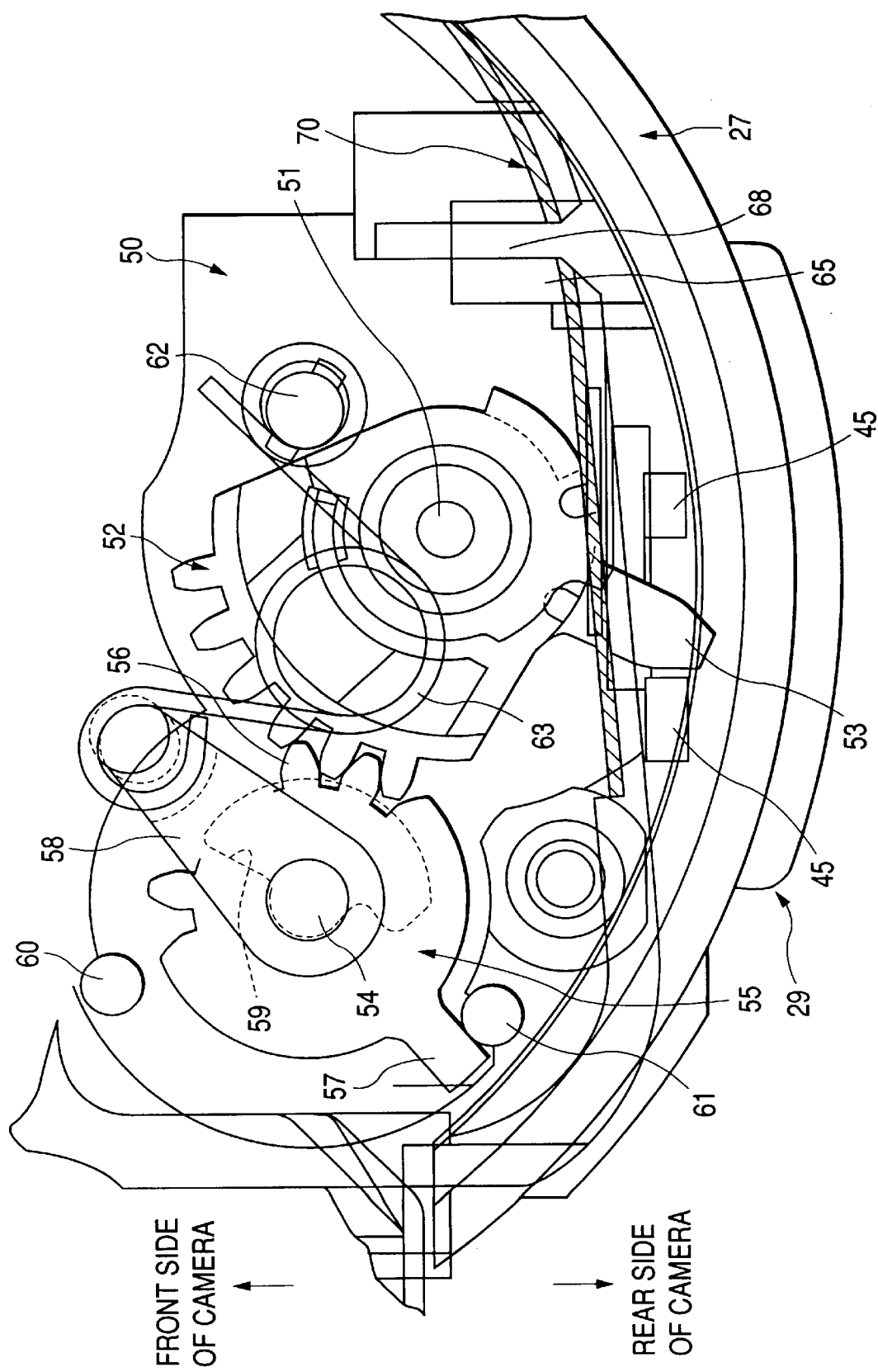
FIG. 8 is an enlarged plan view of the essential portions of the light-shielding-door opening/closing mechanism, shown in FIG. 6, with the opening/closing lid in an unlocked state.

Further, the partition plate 50 has the door driver 55 axially supported by means of a rotating shaft 54 which is parallel with the rotating shaft 51. The door driver 55 has on an upper surface side of the partition plate 50 a gear portion 56 which engages the relay gear 52, a rotation-restricting arm portion 57 extending in the radial direction, and a spring-loaded arm 58 similarly extending in the radial direction. The rotating shaft 54 is passed through the partition plate 50, and extends into the film cartridge chamber 25, and the upper engaging shaft 30 (FIGS. 1 and 2) is fixed to an end portion thereof. This engaging shaft 30 engages the light-shielding-door actuating shaft 18 of the film cartridge 10, and when the door driver 55 rotates about the rotating shaft 54, the engaging shaft 30 opens or closes the light shielding door 17 via the light-shielding-door actuating shaft 18. A pair of rotation restricting pins 60 and 61 are provided projectingly on the upper surface of the partition plate 50, and the amount of rotation of the door driver 55 is restricted to the range in which the rotation-restricting arm portion 57 engages the pair of rotation restricting pins 60 and 61. The portion indicated by reference numeral 59 in FIGS. 6 to 8 is an escape hole which is formed in the partition plate 50 to secure a region for movement of the engaging shaft 30 having the radially projecting portion when the door driver 55 undergoes the aforementioned rotation. Accordingly, when the door driver 55 rotates, the engaging shaft 30 which projects in the film cartridge chamber 25 can also rotate therewith. The rotating position of the door driver 55 (engaging shaft 30) is determined such that the position where the rotation-restricting arm portion 57 engages the rotation restricting pin 60 becomes the position for opening the light shielding door 17, and the position where the rotation-restricting arm portion 57 engages the rotation restricting pin 61 becomes the position for closing the light shielding door 17. In addition, an end portion of the aforementioned spring-loaded arm 58 is connected to a spring-loaded projection 62 on the partition plate 50 through an acting-direction reversing spring (a dead-point spring) 63. The acting-direction reversing spring 63 is a spring which urges the door driver 55 to allow the rotation-restricting arm portion 57 to engage either one of the rotation restricting pin 60 or the rotation restricting pin 61, and whose urging direction is reversed when the door driver 55 rotates from that urged position and reaches predetermined a dead point of action. For this reason, even if there is a clearance between the driving leg 45 and the rotatively operating arm portion 53, the door driver is resiliently held at either the position for opening the light shielding door 17 or the position for closing the light shielding door 17.

Further, an ejector lever 65 (FIG. 5) is supported by the inner surface of the rear outer appearance cover 27 in such a manner as to be movable in the vertical direction. The ejector lever 65 is urged toward the bottom of the camera by an extension spring 66, and a lever lower end portion 67 projects from the lower end of the rear outer appearance cover 27 at the urged position. If the opening/closing lid 23 is closed, the lever lower end portion 67 is pushed in against the extension spring 66, and the ejector lever 65 is moved in the upward direction of the rear outer appearance cover 27. If the opening/closing lid 23 is opened, the restriction against the lever lower end portion 67 is canceled, so that the ejector lever 65 returns to the urged position. This operation of the ejector lever 65 accompanies the opening and closing of the opening/closing lid 23, and the ejector lever 65 is not mechanically connected to the lock mechanism 28 and the light-shielding-door opening/closing mechanism 29. A key-shaped pushing end portion 68 is provided at the upper end of the ejector lever 65.

The members such as the driving lever 36 and the ejector lever 65 are provided in the space between the inner surface of the rear outer appearance cover 27, which has a substantially cylindrical shape, and the flat-shaped side surface 13 of the film cartridge 10, and these members are covered with a parent plate 70 (FIGS. 4 and 6). The parent plate 70 is a plate-shaped member having a shape conforming to the flat-shaped side surface 13 of the film cartridge 10, and has the functions of stably holding the film cartridge 10 and protecting the driving mechanism made up of the lock mechanism 28 and the light-shielding-door opening/closing mechanism 29.

The lock mechanism 28 and the light-shielding-door opening/closing mechanism 29 which are arranged as described above operate as follows. The operation of the lock lo mechanism 28 will be described with reference to FIG. 5, and the operation of the light-shielding-door opening/closing mechanism 29 will be described with reference to FIGS. 7 and 8.

When the film cartridge 10 is not loaded in the film cartridge chamber 25, and the opening/closing lid 23 is closed, it is first necessary to open the opening/closing lid 23. At this time, the driving lever 36 is at the locked position, and the lock leg 43 locks the opening/closing lid 23 (lock leg 44). Here, if the operating lever 31 is operated in the direction of arrow A in FIG. 1, the driving plate 33 rotates clockwise (FIG. 5), which in turn causes the engaging projection 34 to push in the rotatively operating portion 39, with the result that the driving lever 36 is rotated clockwise, i.e., in the unlocking direction, against the torsion spring 38. When the driving lever 36 is rotated in that direction, the engagement between the lock leg 43 and the lock leg 44 is canceled, allowing the opening/closing lid 23 to be openable. At this time, when the bent arm portion 41 of the driving-lever retaining spring 40 rides over the inclined surface 42a, the bent arm portion 41 engages the upright wall 42b while pushing in the lock leg 44 in the opening direction of the opening/closing lid 23. As a result, the driving lever 36 is retained at the unlocked position. Incidentally, at this point of time, the driving plate 33 is returned to the urged position by the extension spring 35.

Since the lock of the opening/closing lid 23 is canceled by the above-described operation, the film cartridge 10 is inserted into the film cartridge chamber 25. This insertion is effected in a state in which the end surface of the film cartridge 10 on the side where the light-shielding-door actuating shaft 18 is provided faces the upper end (innermost end) of the film cartridge chamber 25. When the film cartridge 10 is inserted into the innermost recess of the film cartridge chamber 25, the light-shielding-door actuating shaft 18 of the film cartridge 10 is engaged with the engaging shaft 30 of the door driver 55 at the closing position (FIG. 8). In addition, the spool driving shaft 26 engages the cartridge spool 12.

Meanwhile, the light-shielding-door opening/closing mechanism 29 in the unlocked state is at the actuating position shown in FIG. 8. The door driver 55 is at the position for causing the rotation-restricting arm portion 57 to engage the rotation restricting pin 61, i.e., at the position for closing the light shielding door 17, via the relay gear 52 whose rotated position is controlled by the driving leg 45 at the upper end of the driving lever 36. The position of the door driver 55 is held by the urging force of the acting-direction reversing spring 63.

After the film cartridge 10 is inserted, the opening/closing lid 23 is closed. Through this closing operation, the lock leg 44 pushes up the driving-lever retaining spring 40 to cancel the engagement between the bent arm portion 41 and the upright wall 42b, and the driving lever 36 is returned to the locked position by the urging force of the torsion spring 38 and is held thereat. Then, the lock leg 43 engages the lock leg 44, so that the opening/closing lid 23 becomes unopenable. In the closing operation of the opening/closing lid 23, the lever lower end portion 67 is simultaneously pushed in, so that the ejector lever 65 is moved to the upper end side of the film cartridge chamber 25. At this time, the pushing end portion 68 of the ejector lever 65 is moved toward the upper end side (innermost side) of the film cartridge chamber 25 further than the upper end surface of the film cartridge 10, and does not engage the film cartridge 10.

Figure 5:
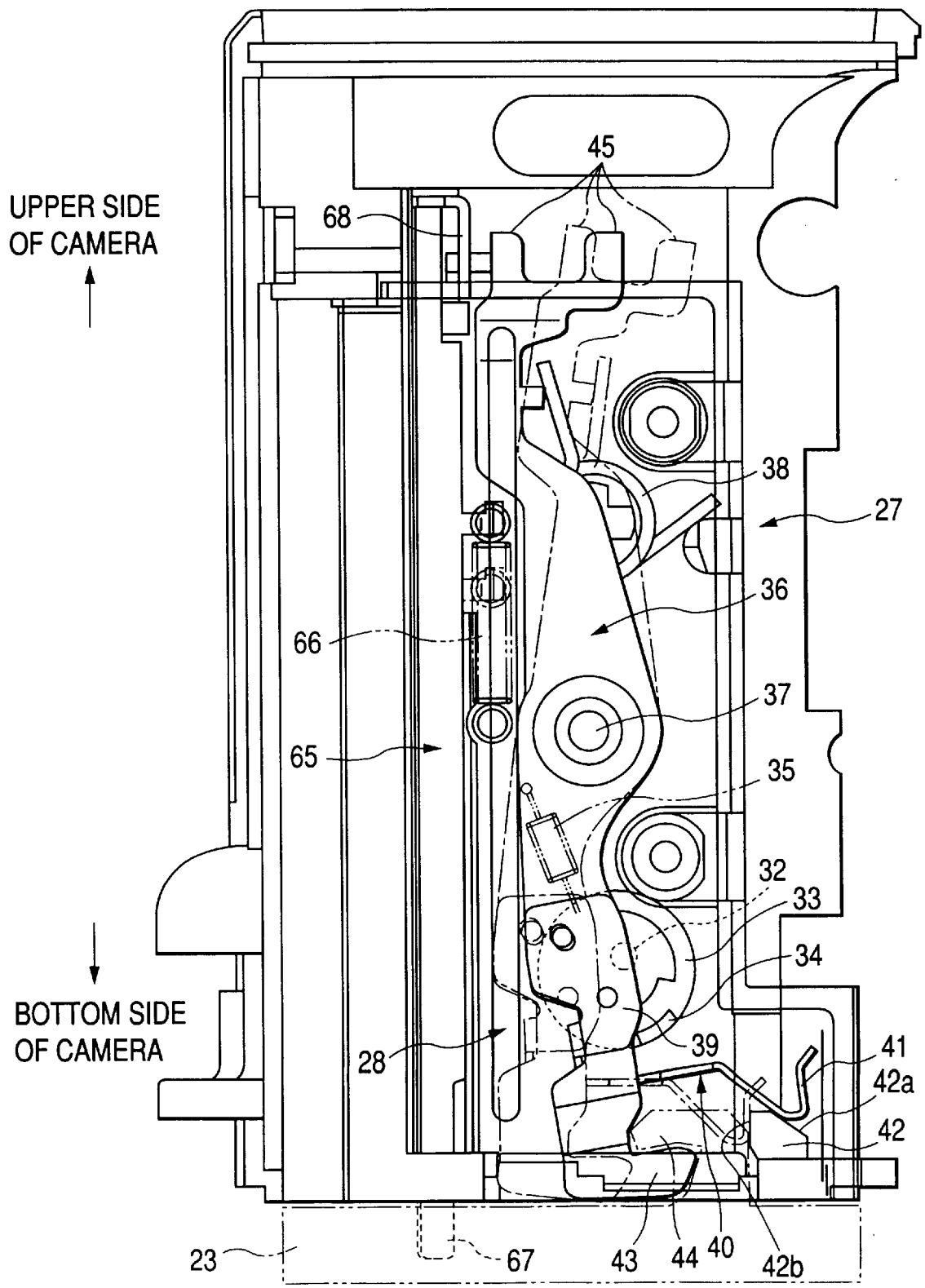
FIG. 5 is a front elevational view, taken from the front side of the camera, of a rear cover constituting the film cartridge chamber as well as parts of a driving mechanism assembled onto the rear cover.

When the driving lever 36 is moved to the locked position, the driving leg 45 moves in the leftward direction (to the position indicated by the solid lines) in FIG. 5, and is driven to the actuating position (FIG. 7) in which the light-shielding-door opening/closing mechanism 29 opens the light shielding door 17. First, the relay gear 52 is rotated counterclockwise from the position shown in FIG. 8 by the moving force of the driving leg 45. The door driver 55 with the gear portion 56 engaged with the relay gear 52 is rotated clockwise against the acting-direction reversing spring 63 from the position where the rotation-restricting arm portion 57 engages the rotation restricting pin 61. When the rotation of the door driver 55 exceeds a predetermined dead point of action, the urging direction of the acting-direction reversing spring 63 is reversed, and the door driver 55 is rotated by the spring force of the acting-direction reversing spring 63 to the position where the rotation-restricting arm portion 57 engages the rotation restricting pin 60. Following this rotation, the relay gear 52 is rotated counterclockwise to a predetermined position. Through the above-described clockwise rotation of the door driver 55, the light-shielding-door actuating shaft 18, which is engaged with the engaging shaft 30 of the door driver 55, is rotated in the same direction, thereby opening the light shielding door 17. When the light shielding door 17 is opened, the spool driving shaft 26 projecting from the upper end of the film cartridge chamber 25 rotates the cartridge spool 12 once in the rewinding direction, an unillustrated data reader reads information on the data disk 19, and the spool driving shaft 26 then rotates the cartridge spool 12 in the feeding direction, thereby feeding the film F from the film advancing/retreating port 15. When a fixed amount of the film F is fed out, the film F is wound around the takeup spool, and photographing is thus made possible.

Thereafter, exposure and film advancing are effected for each photographed frame. Incidentally, when the film F is fed out from the film cartridge 10, a safety mechanism (not shown) for inhibiting the operation of the operation lever 31 is operated, so that the operations of unlocking the opening/closing lid 23 and closing the light shielding door 17 cannot be performed.

When the film F is accommodated in the film cartridge 10 either when the film F is exposed up to a final frame and is automatically rewound, or when the film F is forcibly rewound halfway of the film, the operation of the operation lever 31 becomes possible. Here, if the operation lever 31 is operated in the direction of A (FIG. 1), the lock mechanism 28 and the light-shielding-door opening/closing mechanism 29 perform operation which is opposite to that during the locking operation.

Upon receiving the operation of the operation lever 31, the driving lever 36 rotates about the rotating shaft 37 in the unlocking direction (clockwise in FIG. 5), thereby canceling the engagement between the lock leg 43 and the lock leg 44. The lock leg 44 is pushed in the opening direction of the opening/closing lid 23 by means of the driving-lever retaining spring 40. The driving-lever retaining spring 40 causes the bent arm portion 41 to engage the upright wall 42b, and thereby retains the driving lever 36 at the unlocked position.

At the same time, the position of the driving leg 45 moves from the position indicated by the solid lines in FIG. 5 to the position indicated by the broken lines. As a result, the relay gear 52 is rotated clockwise in FIG. 7, so that the door driver 55 is rotated counterclockwise. When the acting-direction reversing spring 63 goes over the dead point of action, the acting-direction reversing spring 63 rotatively urges the door driver 55 in the direction in which the rotation-restricting arm portion 57 is engaged with the rotation restricting pin 61, and causes the light-shielding-door actuating shaft 18 engaged with the engaging shaft 30 of the door driver 55 to rotate in the same direction.

Consequently, the light shielding door 17 is closed, so that the interior of the housing 11 is shielded from light. Since the unlocking operation with respect to the opening/closing lid 23 and the closing operation of the light shielding door 17 are effected simultaneously by the driving lever 36, light is prevented from leaking before the light shielding door 17 is closed.

Here, the opening/closing lid 23 is opened, and the film cartridge 10 is removed. If the opening/closing lid 23 is opened, the ejector lever 65 is moved by the spring force of the extension spring 66 in the direction in which the lever lower end portion 67 is made to project. This moving force causes the pushing end portion 68 to abut against the upper end surface of the housing 11, and the film cartridge 10 is pushed out lightly to the extent that the lower portion of the housing 11 projects slightly from the film cartridge chamber 25. Accordingly, the ejector lever 65 makes it possible to prevent the film cartridge 10 from being detained in the cartridge chamber 25, thereby facilitating the removal of the film cartridge 10.

A second characteristic of the present invention lies in that the driving mechanism made up of the lock mechanism 28 and the light-shielding-door opening/closing mechanism 29 are partially supported by the rear outer appearance cover 27. Since the rear outer appearance cover 27 is formed separately from the camera body 21, after members such as the driving lever 36 are mounted first, the rear outer appearance cover 27 can be secured from the rear side of the camera body 21. That is, the assembling efficiency improves as compared with a structure in which the entirety of the cartridge chamber in a hollow cylindrical shape is formed only by the camera body, and the lock mechanism and the light-shielding-door opening/closing mechanism are fitted around such cartridge chamber. As for the assembling efficiency, although essential portions of the light-shielding-door opening/closing mechanism 29 are disposed also on the partition plate 50, since the door driver 55 is urged to the positions of movement at both ends by means the acting-direction reversing spring 63, it is possible to provide a clearance between the driving leg 45 and the rotatively operating arm portion 53. That is, it is possible to provide leeway in the assembling of the rear outer appearance cover 27, and it is possible to allow the door driver 55 to effect necessary rotating operation.

In addition, while the film cartridge 10 has the flat-shaped side surface 13, the inner surface of the rear outer appearance cover 27 has a hollow cylindrical shape, so that a slight space is produced therebetween. However, since parts of the above-described driving mechanism (the lock mechanism 28 and the light-shielding-door opening/closing mechanism 29) are arranged within this space, the arrangement excels in the space utilization efficiency. Further, the driving mechanism is covered with the parent plate 70 so as to protect the driving mechanism from becoming exposed to the interior of the film cartridge chamber 25 and to stabilize the film cartridge 10 in the loaded state at the same time.

As described above, since the body structure is arranged such that a portion of the film cartridge chamber is formed by the outer appearance member which is formed separately from the camera body, the camera can be made compact in size. In addition, since parts of the driving mechanism for locking the opening/closing lid and for opening or closing the light shielding door of the film cartridge are assembled onto the separate outer appearance member which forms a part of the film cartridge chamber, the space utilization efficiency improves, and the assembly of the driving mechanism is also facilitated.

What is claimed is:

1. A body structure of a camera, comprising:
   a camera main body having a partial portion of a cylinder;
   a rear cover discrete from said camera main body and fixedly attached to a rear of said camera main body, said rear cover having a partial portion of a cylinder, said partial portion of said cylinder of said camera main body and said partial portion of said cylinder of said rear cover together defining a substantially cylindrical film cartridge chamber, and an outer surface of said rear cover defining at least a portion of an external cylindrical surface of said camera; and
   an opening/closing lid for insertion and removal of a film cartridge, said opening/closing lid being located at an axial end portion of said substantially cylindrical film cartridge chamber.

2. The body structure according to claim 1, further comprising:
   a driving mechanism for opening and closing a light shielding door of a film cartridge loaded in said film cartridge chamber, said driving mechanism linked to opening and closing operation of said opening/closing lid to close the light shielding door when said opening/closing lid is opened and to open the light shielding door when said opening/closing lid is closed, said driving mechanism being at least partially supported by said rear cover.

3. The body structure according to claim 2, wherein said driving mechanism includes:
   a driving lever pivotally supported on an inner surface of said rear cover; and
   an operation lever pivotally supported on said outer surface of said rear cover.

4. The body structure according to claim 3, further comprising:
   an ejector lever for urging said film cartridge inserted in said film cartridge chamber toward said opening/closing lid, said ejector lever being supported by the inner surface of said rear cover.

5. The body structure according to claim 4, further comprising:
   a plate-shaped member for at least partially covering said driving mechanism, said member being provided on the inner surface of said rear cover.

6. A body structure of a camera, comprising;
   a camera main body having an arcuate first inner surface portion and an arcuate first outer surface portion;
   a homogenous one-piece cover discrete from said camera main body and fixedly attached to said camera main body, said one-piece cover having an arcuate second inner surface portion and an arcuate second outer surface portion, said arcuate first and second inner surface portions being conjoined together to form a film cartridge chamber, and said arcuate first and second outer surface portions being conjoined together to form a portion of an exposed outer appearance of said camera, and said arcuate first and second outer surface portions forming a continuous arcuate outer surface when conjoined together; and
   an opening/closing lid for insertion and removal of a film cartridge, said opening/closing lid being located at an axial end of said film cartridge chamber and movably supported on one of said camera main body and said cover.

* * * * *